United States Patent [19]
O'Shaughnessy

[11] 3,911,245
[45] Oct. 7, 1975

[54] HEATED MULTIPLE-PANE GLASS UNITS

[75] Inventor: Roger D. O'Shaughnessy, Minneapolis, Minn.

[73] Assignee: Cardinal Insulated Glass Co., Minneapolis, Minn.

[22] Filed: Apr. 15, 1974

[21] Appl. No.: 460,979

[52] U.S. Cl. .................... 219/218; 62/150; 62/248; 219/522; 219/543
[51] Int. Cl.² .................... H05B 1/00; H05B 3/26
[58] Field of Search ...... 219/218, 522, 543; 62/150, 62/248; 312/236; 52/173

[56] References Cited
UNITED STATES PATENTS

| | | | |
|---|---|---|---|
| 1,877,685 | 9/1932 | Ottenheimer | 62/248 X |
| 2,497,507 | 2/1950 | McMaster | 219/522 |
| 2,513,993 | 7/1950 | Burton | 219/543 X |
| 2,866,881 | 12/1958 | McMillen | 219/543 X |
| 2,953,764 | 9/1960 | Tellkamp | 338/309 |
| 3,263,063 | 7/1966 | Marriott et al. | 219/218 X |
| 3,370,262 | 2/1968 | Marty et al. | 338/309 |
| 3,524,920 | 8/1970 | Stromquist et al. | 219/543 X |
| 3,655,939 | 4/1972 | Stromquist | 219/218 |

Primary Examiner—C. L. Albritton
Attorney, Agent, or Firm—Walter N. Kirn, Jr.

[57] ABSTRACT

A sealed insulating glass unit for refrigerator doors and windows, two adjacent glass panes of which are separated by no more than about 2 mm. to provide a thin air space, and heating elements disposed over at least one of the inner faces of the unit to inhibit frosting and fogging.

12 Claims, 5 Drawing Figures

HEATED MULTIPLE-PANE GLASS UNITS

BACKGROUND OF THE INVENTION

1. Field of the Invention

This invention relates to glass units and especially to heated, sealed, insulating glass units having a multiplicity of panes for use as refrigerator windows and doors.

2. Description of the Prior Art

Grocery markets display perishable foods under refrigeration, either in open doorless cabinets or closed cabinets having sliding or hinged glass-paneled doors. From an energy conservation standpoint, open display units, which utilize a cold air current to maintain the desired low temperature, are highly inefficient. More than ever the trade is employing the closed units which have transparent windows or doors through which the refrigerated merchandise can be viewed. To reduce heat loss, sealed multiple-pane glass units are employed having a thermally insulating space between adjacent panes. The space is generally moisture free or filled with dehydrated air.

Fogging or frosting of the exposed glass panes is a continual problem with refrigerator glass units, being especially prevalent on frozen food or low temperature cabinets. The temperature of the exposed face of the glass pane facing the nonrefrigerated room is cooler than room temperature. If the temperature of the exposed face of the pane drops below the dew point of the surrounding air, moisture condenses on this exposed face with consequent obstruction of vision through the glass unit. Condensation can also occur on the face of the glass pane exposed to the cabinet interior.

To alleviate condensation and frosting problems, glass refrigerator windows have been equipped with heating units. The heating units generally take the form of a pair of parallel, spaced conductive bars (bus bars) extending along and adjacent to opposing edges of a face of a glass pane and a transparent, electrically conductive film disposed between the bus bars. Electrical current is brought to one of the bus bars, and is conducted across the pane face via the conductive coating to the opposing bus bar. The electrical energy moving across the face of the glass pane is converted to heat energy.

At least two major drawbacks attend heating units of the above type. One concerns the safety hazard presented by the electrical circuitry in the breakable window unit. While the electrical circuitry is located on an inner glass surface to which people are not exposed under normal conditions, breaking the glass pane can expose the live circuit elements, and thus, pose a severe shock situation. To prevent this hazardous condition requires that the electrical power be removed upon breakage of the glass unit or any other event which could result in exposure to electrical power.

Various safety measures have been devised to remove the electrical power from the glass unit in response to an event such as glass breakage. Certain devices directly respond to the physical crack in the bus bar (see, e.g., U.S. Pat. Nos. 3,475,594; 3,379,859) while another sytem involves a mechanism which indirectly responds to a crack in the pane whether occurring in the bus bar or elsewhere by sensing a pressure change in the unit (see, U.S. Pat. No. 3,655,939).

In addition to the safety hazard factor with heated, multiple-pane glass refrigerator units, there is an aesthetic problem. The electrical current passes from a first bus bar situated adjacent one edge of the glass pane through the conductive film covering the glass pane to the bus bar situated adjacent the opposing edge of the glass pane. The first conductive bus bar must be electrically isolated except for contact with the conductive film. In conventional multiple-pane windows where the adjacent panes are generally separated by 6 mm. or more, the spacing is provided by metallic spacers which extend around the margin of the glass pane. In order to avoid electrical contact with such spacers, the bus bars are located a considerable distance inside the edge of the pane out of contact with the conductive spacer. This places the bus bars in the viewing area of the window.

It is an object of the present invention to provide sealed, multiple-pane glass units adapted to be heated which pose a reduced safety hazard or allow for the use of less expensive auxiliary safety devices than previous units.

Another object is a multiple-pane glass unit adapted to be heated wherein the conductive bus bars are hidden from view.

SUMMARY OF THE INVENTION

In accordance with the present invention, a multiple-pane glass unit is provided comprising at least first and second glass panes in aligned, face-to-face relationship; electically insulating spacing material perimeterly disposed between said first and second glass panes to provide a confined space between said first and second glass panes, said space being of a width adapted to prevent condensation of moisture in normal atmospheric air entrapped therein; first and second electrodes in parallel relationship adherably bonded to one of the opposing faces of said first and second glass panes; and an electrically conductive coating adherably bonded to said face having said first and second electrodes between said first and second electrodes, said coating providing an electrically conductive path between said first and second electrodes.

It has been found that by maintaining a maximum distance of about 2 mm. between the first and second panes, the air between the panes need not be evacuated, dehydrated, or replaced with a dry gas. In addition, electrically insulating spacing material replaces the metallic, electrically conductive spacers between the first and second panes which allows the bus bars to be buried or covered by the spacing material rather than exposed in the viewing area.

In commercial embodiments, it is expected that a third pane will be present adjacent to the second pane referred to above. This third pane will generally, but not necessarily, be conventionally spaced from the second pane, the distance being about 6 mm. or greater. A conventional metallic spacer may be employed between the second and third panes in those cases where the bus bars and conductive film are not on one or both of the opposing faces of the second and third panes. As will be seen, the preferred spacing medium between the first and second panes is a deformable, circular cross-sectional bead of a polymeric material such as butyl rubber which is free of substances, especially volatile substances, which could be released into the air space and cause fogging or other obstructions of view. The bead is preferably slightly greater in its cross-sectional dimension at the time of deposition than the desired distance between the first and second panes. The weight of one of the first and second panes when placed on top of the other compresses the bead to achieve the proper gap between the first and second panes thereby creating a positive pressure in the thin air space which allows the first and second panes to maintain a constant, fixed position relative to each other. As noted above, no precautions or treatments are required for the dead space between the first and second panes. It is theorized that this is so because the gap is so narrow as to deprive the air molecules of the mobility which would otherwise result in condensation of the moisture associated with the air.

BRIEF DESCRIPTION OF THE DRAWINGS

Throughout the figures and description thereof, like numerals will be used to designate like parts.

DESCRIPTION OF PREFERRED EMBODIMENTS

Figure 1:
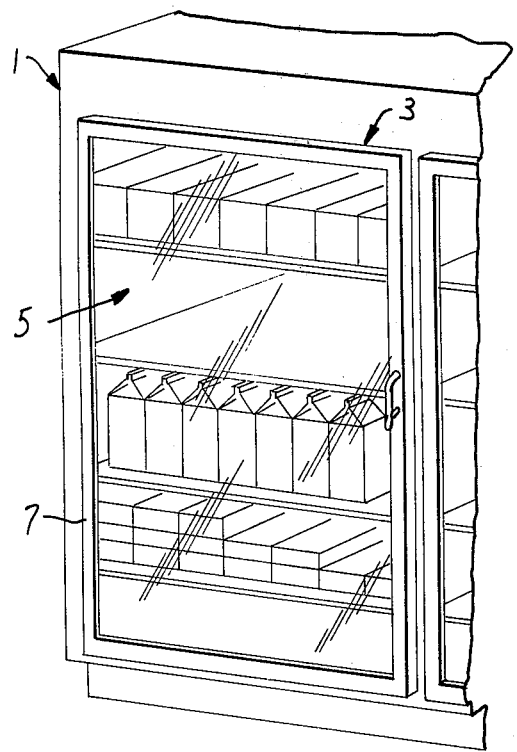
FIG. 1 is a schematic view of a refrigerator cabinet having a hinged, multiple-paned glass door of the present invention.

Illustrative of the environment in which the present invention is utilized, FIG. 1 depicts a refrigerator cabinet 1 housing numerous dairy products under refrigeration. Cabinet 1 has a hinged door 3 equipped with a multiple-pane window 5 encased in frame 7.

Figure 2:
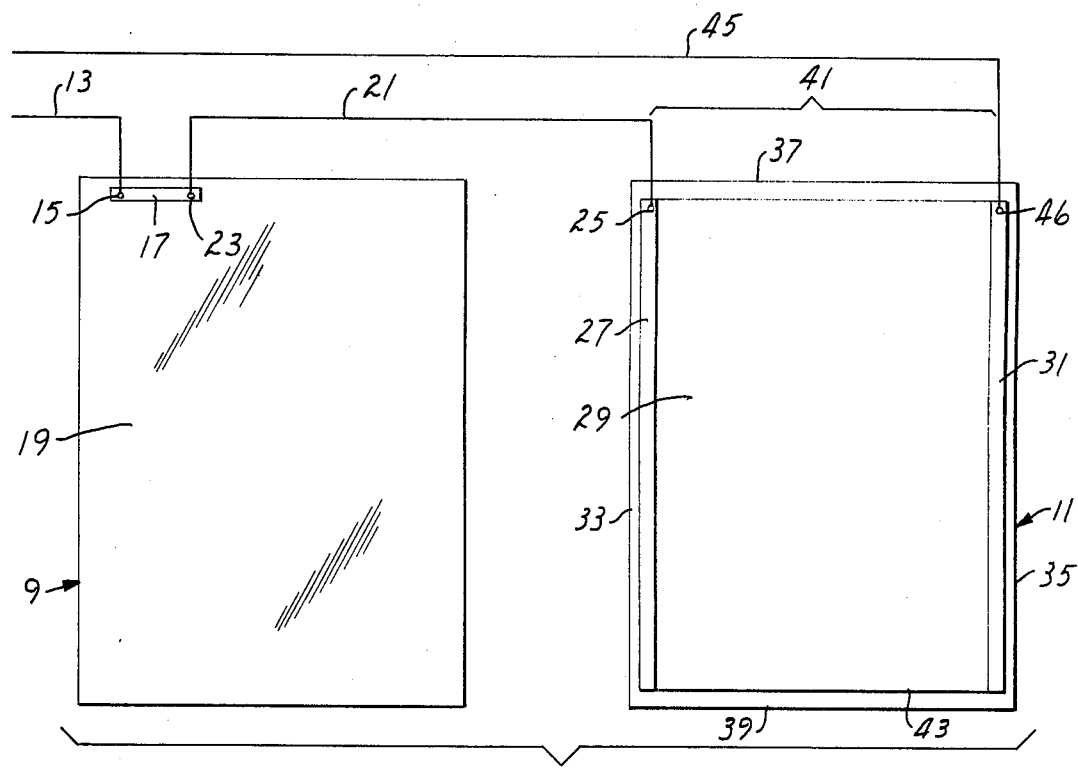
FIG. 2 is a front view in elevation of the inner face of a first and second pane of a multiple-pane glass unit of this invention.

In FIG. 2 there is shown side-by-side a first pane 9 and a second pane 11. The glass per se in both panes is electrically insulating. A lead-in electrically conductive wire 13 is connected at one contact 15 to a short conductive strip 17 bonded to the inner face 19 of pane 9. The other end of wire 13 is connected to a conventional source of electrical power (not shown). The connection of wire 13 to strip 17 may be of any conventional type such as solder or the like. Strip 17 is preferably a metallic strip such as silver which is painted or screened onto the pane surface and then bonded thereto when pane 9 is tempered or ceramified. Strip 17 is located adjacent the upper lefthand corner of pane 9. The strip 17 is typically about 60 mm. long and 6 mm. wide. Any crack in the tempered pane will travel to conductive strip 17 and interrupt the flow of electrical current to the exposed heating elements and bus bars of pane 11. The breakage of tempered glass assures the break and resulting current interruption (see ANSI Z97.1 1972 Standard for tempered safety glass.)

A second wire 21 is connected at one end of strip 17 at contact 23 and at the other end to pane 11 at a contact 25 located on conductive bar 27. Pane 11, of the same width and length dimensions as pane 9, includes inner face 29 to which are adhered two conventional conductive bars 27 and 31. Bars 27 and 31 are positioned within the margin of face 29, adjacent the left and righthand edges 33 and 35, respectively, of face 29 and extend in the longitudinal direction substantially, but not completely, to the edges 37 and 39 thereof. Located between bars 27 and 31 in area 41 and in electrical contact therewith is a continuous, transparent conductive film 43. Area 41 is bounded by the adjacent edges of bars 37 and 31 and lines extending between the adjacent ends of bars 27 and 31. A common wire 45 is connected to bar 31 at contact 46.

The conductive bars, which typically range in thickness from 0.005 to 0.025 mm. thick, can be formed of any suitable conductive material which will adhere to the glass. The bars might be deposited as a metallic solder or might be fabricated from a conductive bake-on paint. While bars 27 and 31 are shown as located along the lengthwise dimension of the face 29, they could be located along the widthwise dimension if desired. Bars 27 and 31 are positioned so as to be covered by the spacing material which will form the seal between panes 9 and 11 when in place.

The conductive film 43 may be composed of any material which is electrically conductive, capable of forming a continuous, adherent film, and is at least substantially transparent. A tin oxide film of the type described in U.S. Pat. NO. 2,429,420 is suitable. Film thicknesses of 400–1,000 Angstroms are generally suitable.

Figure 3:
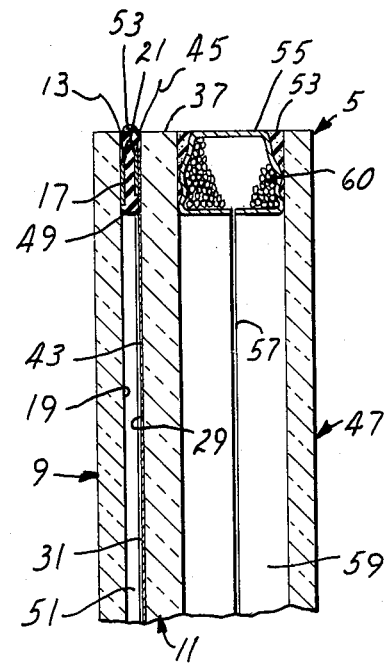
FIG. 3 is a partial cross-sectional view of a multiple-pane glass unit of this invention embodying the first and second panes of FIGS. 2 and 4.

In FIG. 3, panes 9 and 11 are arranged as part of a multiple-pane glass unit 5 including a third glass pane 47. A bead of electically insulating, spacing material 49 provides the space 51 between inner faces 19 and 29 is such that the entrapped air occupying space 51 is stable, without the need for evacuation, replacement with dry gas, or use of dehydrating agents. A space of 2 mm. or less has proved suitable. Spacing material 49 should be electrically insulating, capable of providing a seal between panes 9 and 11, and free of substances which will volatilize or otherwise work free and interfere with the view through panes 9 and 11. A preferred spacing material is a butyl rubber such as polyisobutylene containing a minor amount of nonconductive carbon black. Spacing material 49 is preferably used in the form of a continuous bead circular in cross-section and having a diameter of about 2.5 to 3 mm. After laying the bead in spaced, parallel relationship to the entire outside border of the inner faces of one of panes 9 and 11, the two panes 9 and 11 are then placed in face-to-face relationship, squeezing the bead to 2 mm. thickness or less. The compressed bead covers the conductive bars 27 and 31 as well as conductive strip 17 (see FIG. 4). Spacing material 49 provides not only the spacing function but also a sealing function. After panes 9 and 11 are positioned in place, an auxiliary material 53 is placed between panes 9 and 11 along the outer perimeter of spacing material 49. Auxiliary material 53, such as a two-part polysulfide, serves as a sealer and adhesive to provide a strong bond line along the far outside edge of panes 9 and 11. Auxiliary material 53 may but need not be electrically insulating as is spacing material 49. So long as spacer material 49 has effectively sealed the thin air space from the outside, auxiliary sealant 53 need not be free of volatiles or other components which could escape to the thin air space and obstruct vision.

A third glass pane 47 is positioned in parallel, spaced relationship to pane 11 by means of hollow metal spacer 55. Spacer 55 has a seam 57 which provides a very narrow opening for communication between the interior of spacer 55 and dead space 59 between panes 11 and 47. Dead space 59 is at least twice and generally more than three times wider than the space between the first and second panes (panes 9 and 11). Spacer 55 is filled with a dehydrating agent 60 which maintains the gas occupying space 59 in dry condition. Suitable dehydrating agents include silica gels and molecular sieves.

Figure 4:
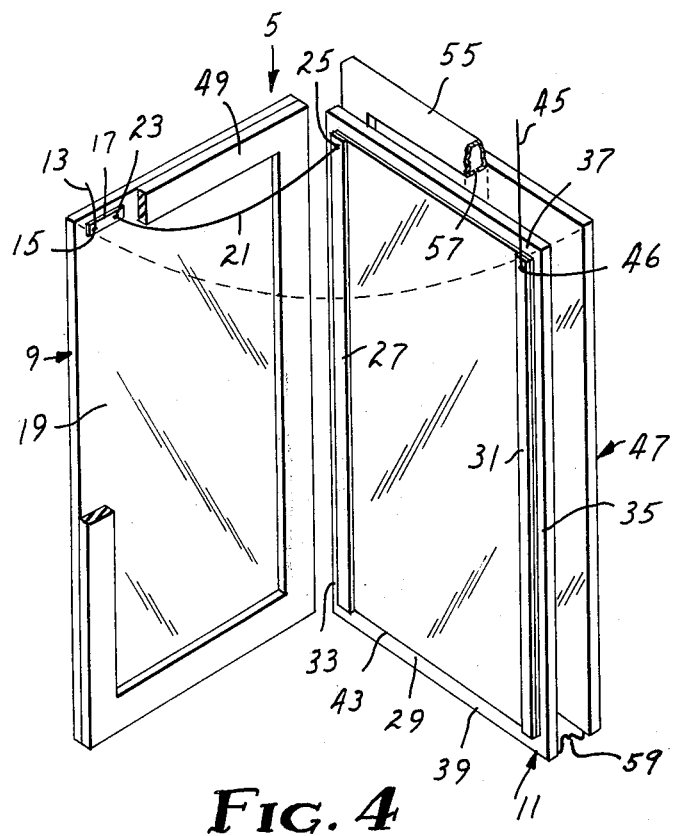
FIG. 4 is a perspective view of the unit of FIG. 3 with the first pane swung away with other elements partially removed or exploded for illustrative purposes.

In the embodiment illustrated in FIGS. 2–4, panes 9 and 47 are preferably tempered glass for safety purposes. Due to the incompatibility between very high temperatures (1,200°F. to 2,000°F.) and the conductive film 43, the present state of the art requires that pane 11 not be tempered.

A suitable procedure for making the multiple-pane glass unit of FIGS. 2–4 involves preparing the first and second panes, connecting the various circuit elements, bonding the two panes, preparing the third pane, laying the metal spacer, and then assembling the unit. Pane 9 is prepared for assembly by first applying the conductive strip 17 in the form of a silver paint to face 19 by a silk screen process. The strip is then fired into the face 19 in the process of tempering pane 9. Contacts 15 and 23, in the form of solder, are then applied to strip 17 by tinning and the pane 9 is then sent through a conventional washer for cleaning. After cleaning, wires 13 and 21 are joined to contacts 15 and 23, respectively, by soldering.

Pane 11, including the conductive bars 27 and 31 and conductive film 43, is commercially available. Contact points 25 and 46 are provided on bars 27 and 31, respectively, by the same tinning and soldering procedure described above. Pane 11 is then washed in the same manner as pane 9. With panes 9 and 11 lying face up next to each other, wire 21, attached to contact 23 of pane 9, is then attached to contact 25 of pane 11 and wire 45 is attached to contact 46. Wire 21 is long enough to be run up face 19 then across the space between faces 19 and 29 and then down face 29 to contact 25. After wiring panes 9 and 11 together, the spacer material 49 in the form of a continuous bead 2 to 3 mm. in diameter is then laid around the perimeter of face 29 of pane 11 so that it lies over the conductive bars 27 and 31. Then pane 11 is placed over pane 9 with faces 19 and 29 in facing relationship. The weight of pane 11 and eventually other elements of the unit causes the bead of spacing material 49 to be compressed so that the space between panes 9 and 11 is ultimately reduced to about 2 mm. or less. This squeezing of the spacing material creates a positive pressure between panes 9 and 11 which inhibits misalignment of panes 9 and 11 during use.

After panes 9 and 11 have been sandwiched, the metal spacer 55, preferably but not necessarily bearing a thin sealant coating along the sides, is laid around the edge of the back face of pane 11. Pane 47 is then placed over pane 11. The entire unit is then sealed with auxiliary material 53 by filling the void between spacing material 49 and the edge of panes 9 and 11 and the voids between metal spacer 55 and the panes 11 and 47. The wires 13, 21, and 45 are also embedded in the auxiliary material 53. After curing of the auxiliary material and trimming any excess, the multiple-pane unit is ready for mounting in a suitable frame.

Figure 5:
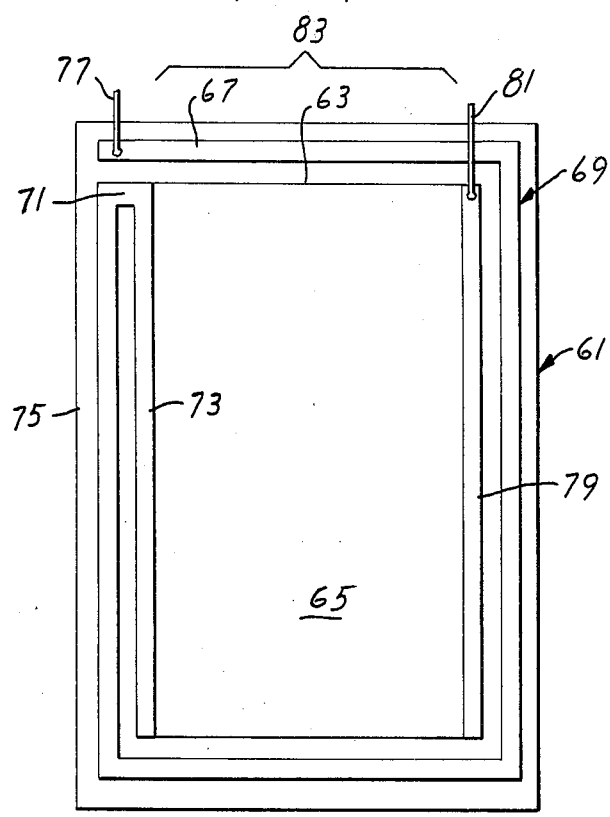
FIG. 5 is a front view in elevation of another inner face of a pane of this invention.

FIG. 5 depicts a pane 61 which substantially embodies, in a single pane, the electrical features provided by the combination of panes 9 and 11 described above. Pane 61 is electrically insulating. Due to the presence of the electrically conductive film 63, pane 61, like pane 11 in the above-described embodiment, is heat strengthened rather than tempered. Extending all but a short distance around the perimeter of face 65 of pane 61 is a first portion 67 of a conductive bar 69. The first portion 67 is adjacent the edge of face 65. Just prior to rejoining first portion 67, conductive bar 69 makes a bend 71 and doubles back forming a second portion 73 in parallel-spaced relationship to the edge 75 of pane 61 and inward of the first portion 67 of bar 69. A wire 77 from an electrical power source (not shown) is connected to conductive bar 69. Across the face 65 from second portion 73 of conductive bar 69 and in parallel-spaced relationship thereto is a second conductive bar 79. A ground wire 81 is connected to bar 79. Located in area 83 which is bound by the opposing edges of bars 73 and 79 and straight lines joining the adjacent ends of bars 73 and 79 is conductive film 63.

The configuration of bar 69 of pane 61 is such that any crack in pane 61 would extend to bar 69 thereby breaking the circuit and removing the power from the pane. In this respect, the first portion 67 of bar 69 functions in a similar manner to the conductive strip 17 of pane 9. By the same token, second portion 73 of bar 69 and conductive bar 79 function in a similar manner to conductive bars 27 and 31 on pane 11. Because of the dual role played by bar 69, pane 61 may be employed in a multiple-pane glass unit in the position occupied by pane 9 of unit 5. In such a unit having a pane 61, a pane analogous to the position of pane 11 could be replaced by a conventional tempered glass pane free of conductive strips, bars, and films. In addition, since no current would be required other than in pane 61, a wire analogous to wire 21 is eliminated. In all other respects, a unit embodying the pane 61 of FIG. 5 would be similar to unit 5. Due to the circuit-breaking configuration of bar 69, the need for additional circuit-breaking devices is eliminated or at least requires the use of far less expensive devices than those conventionally employed.

While the thin air space is recognized as providing excellent sound control in multiple-pane units, thermal transmittance tests (ASTM C-236) have shown that multiple-pane units having a thin space as herein described exhibit comparable heat insulating qualities (thermal transmittance of 0.44) to three-pane units having conventional dimensioned air spaces, e.g., 6 to 15 mm.

Further, as noted above, a positive pressure can be provided in the thin air space merely by compressing or squeezing the spacing material after the first and second panes (panes 9 and 11 in the case of FIGS. 2–4) have been placed in face-to-face relationship, thereby eliminating the need for introducing additional gas by a syringe or the like. Were it desired to have a dehydrated atmosphere between the first and second panes, one of a variety of measures could be employed such as drilling a small hole between the second and third panes so that the thin air space could communicate with the conventional dimensioned, dehydrated air space between the second and third panes.. Another approach would be to incorporate in the spacing material 49 a compatible drying agent. A still further approach would be to extend an open tube containing dehydrating agent from the thin air space through a hole in the seal between panes to the exterior of the unit in contact with room air. Spent dehydrating agent could be replaced from time to time.

What is claimed is:

1. A multiple-pane glass unit comprising:
   at least first and second glass panes in aligned, face-to-face relationship;
   electrically insulating spacing material perimeterly disposed between said first and second glass panes to provide a confined space between said first and second glass panes, said space being of a width no more than about 2 mm.;
   first and second electrodes in parallel relationship adherably bonded to one of the opposing faces of said first and second glass panes; and
   an electrically conductive coating adherably bonded to said face having said first and second electrodes between said first and second electrodes, said coating providing an electrically conductive path between said first and second electrodes.

2. The unit of claim 1 wherein said spacing material is a compressible polymeric composition.

3. The unit of claim 1 wherein the face of said second pane opposing the face of said first pane bears said first and second electrodes and the face of said first pane opposing the face of said second pane bears electrical conductive means bonded thereto, said electrically conductive means being adapted to conduct electrical current across at least a portion of the face bearing said electrically conductive means and then to one of said first and second electrodes, said first pane being of tempered glass whereby a crack in said first pane causes a discontinuity in said electrical conductive means thereby interrupting current flow to said second pane.

4. The unit of claim 1 wherein said first electrode comprises a first portion extending substantially but not completely along and adjacent to the edge of the pane to which it is adhered, and a second portion electrically connected to said first portion, said second portion being located inwardly of said first portion relative to the edge of said pane and parallel to said second electrode, and said electrically conductive coating is between only said second portion of said electrode and said second electrode.

5. The unit of claim 4 wherein said first pane bears said first and second electrodes.

6. A multiple-pane glass unit comprising:
   first and second glass panes in aligned, face-to-face relationship, said first pane being of tempered glass;
   a third glass pane in aligned, spaced, face-to-face relationship to said second glass pane;
   electrically insulating spacing material perimeterly disposed between said first and second glass panes to provide a confined space between said first and second glass panes, said space being of a width no more than about 2 mm.;
   first and second electrodes in parallel relationship adherably bonded to the face of said second glass pane opposing said first pane, said electrodes being covered by said spacing material;
   an electrically conductive coating adherably bonded to said face of said second pane between said first and second electrodes, said coating providing an electrically conductive path between said first and second electrodes; and
   electrical conductive means bonded to said face of said first pane opposing said face of said second pane adapted to conduct electrical current across at least a portion of said face of said first pane to one of said electrodes on said second pane whereby a discontinuity in said electrical conductive means causes interruption of current to said second pane.

7. The unit of claim 6 wherein said confined space between opposing faces of said first and second glass panes has a pressure greater than atmospheric pressure.

8. The unit of claim 7 wherein said confined space is filled with moist air.

9. The unit of claim 6 wherein said first spacing means comprises polyisobutylene.

10. The unit of claim 6 wherein said spacing material comprises polyisobutylene and a nonelectrically conductive carbon black.

11. The unit of claim 6 wherein said spacing material includes a dehydrating agent.

12. A multiple-pane glass unit comprising:
    first and second glass panes in aligned, face-to-face relationship;
    a third glass pane in aligned, spaced, face-to-face relationship to said second glass pane;
    electrically insulating spacing material perimeterly disposed between said first and second glass panes to provide a confined space between said first and second glass panes, said space being of a width no more than about 2 mm.;
    first and second electrodes adherably bonded to the face of said first glass pane opposing said second pane, said electrodes being covered by said spacing material, said first electrode comprising a first portion extending substantially but not completely along and adjacent to the edge of the pane to which it is adhered, and a second portion electrically connected to said first portion, said second portion being located inward of said first portion relative to the edge of said pane and parallel to said second electrode; and
    an electrically conductive coating adherably bonded to said face of said first pane between only said second portion of said first electrode and second electrode.

* * * * *

UNITED STATES PATENT AND TRADEMARK OFFICE
CERTIFICATE OF CORRECTION

PATENT NO. : 3,911,245
DATED : October 7, 1975
INVENTOR(S) : Roger D. O'Shaughnessy It is certified that error appears in the above-identified patent and that said Letters Patent are hereby corrected as shown below:

Column 4, line 27, after the numeral "29" insert the following --of panes 9 and 11, respectively. The distance between 19 and 29--.

Signed and Sealed this sixth Day of April 1976

[SEAL]

Attest:

RUTH C. MASON
Attesting Officer

C. MARSHALL DANN
Commissioner of Patents and Trademarks